(12) United States Patent
Abke (10) Patent No.: US 7,621,054 B2
(45) Date of Patent: Nov. 24, 2009

(54) APPARATUS AND METHODS FOR DETERMINING ALIGNMENT OF VEHICLE-MOUNTED WHEEL

(75) Inventor: Timothy A. Abke, Zanesfield, OH (US)

(73) Assignee: Honda Motor Company, Ltd., Tokyo (JP)

(*) Notice: Subject to any disclaimer, the term of this patent is extended or adjusted under 35 U.S.C. 154(b) by 160 days.

(21) Appl. No.: 11/724,342

(22) Filed: Mar. 15, 2007

(65) Prior Publication Data

US 2008/0222903 A1 Sep. 18, 2008

(51) Int. Cl.
  *G01B 5/255* (2006.01)
  *G01B 5/24* (2006.01)
  *G01C 15/00* (2006.01)

(52) U.S. Cl. .................. 33/203.18; 33/203; 33/286; 33/288; 33/DIG. 21

(58) Field of Classification Search ................ 33/203, 33/203.12, 203.18, 203.19, 203.2, 227, 228, 33/286, 288, 335, 336, 613, 645, 562, 563, 33/566, DIG. 21; 362/500; 356/155
See application file for complete search history.

(56) References Cited

U.S. PATENT DOCUMENTS

| | | | |
|---|---|---|---|
| 2,292,969 A * | 8/1942 | Peters | 33/288 |
| 4,311,386 A | 1/1982 | Coetsier | |
| 4,466,196 A | 8/1984 | Woodruff | |
| 4,534,115 A * | 8/1985 | Kashubara | 33/203.18 |
| 4,726,122 A | 2/1988 | Andersson | |
| 4,803,785 A | 2/1989 | Reilly | |
| 4,823,470 A | 4/1989 | Hörvallius | |
| 4,827,623 A | 5/1989 | Goodell | |
| 5,168,632 A | 12/1992 | Rimlinger, Jr. | |
| 5,600,893 A | 2/1997 | Phillips | |
| 5,862,602 A * | 1/1999 | Horvallius | 33/203.18 |
| 6,018,879 A | 2/2000 | Carder | |
| 6,082,011 A | 7/2000 | Phillips, III | |
| 6,226,879 B1 | 5/2001 | Baird | |
| 6,282,799 B1 | 9/2001 | Warkotsch | |
| 6,522,400 B1 | 2/2003 | Horn | |
| 6,543,145 B2 | 4/2003 | Lovesy | |
| 6,708,419 B2 * | 3/2004 | Corghi | 33/520 |
| 6,823,598 B1 | 11/2004 | Loescher | |
| 6,880,256 B2 | 4/2005 | Helms | |
| 7,380,344 B2 * | 6/2008 | Dietrich | 33/288 |
| 7,412,773 B2 * | 8/2008 | Hobel et al. | 33/286 |
| 2005/0268475 A1 * | 12/2005 | Hobel et al. | 33/286 |
| 2008/0222903 A1 * | 9/2008 | Abke | 33/203.18 |

* cited by examiner

*Primary Examiner*—Amy Cohen Johnson
(74) *Attorney, Agent, or Firm*—Ulmer & Berne LLP (57) ABSTRACT

An apparatus for determining alignment of a wheel mounted to a vehicle includes a plate, a housing and a light source. The plate has a top surface, a bottom surface, and an outer perimeter. The bottom surface is substantially planar and the outer perimeter includes an engagement portion. The plate is configured such that it may be positioned at least partially within a wheel rim, with the engagement portion and the bottom surface contacting interior circumferential and interior annular surfaces of the wheel rim, respectively, and with the bottom surface substantially perpendicular to the wheel rotational axis. The housing is attached to the top surface of the plate and defines a chamber. The light source is supported at least partially within the chamber and is configured to project light away from the housing. Methods are also provided for manufacturing a vehicle and for inspecting a wheel mounted upon a vehicle.

13 Claims, 5 Drawing Sheets

APPARATUS AND METHODS FOR DETERMINING ALIGNMENT OF VEHICLE-MOUNTED WHEEL

TECHNICAL FIELD

The present invention relates to apparatus and methods for use in determining alignment of a vehicle-mounted wheel.

BACKGROUND OF THE INVENTION

Improper wheel alignment can result in accelerated wear of tire tread, reduced fuel mileage, and/or diminished vehicle handling characteristics. Accordingly, it is often desirable to determine whether a vehicle's wheels are properly aligned. If, through this determination, one or more wheels are found to be improperly aligned, steps can then be taken to adjust and thereby correct the alignment of the wheel(s). Conventional apparatus and methods for determining alignment of a vehicle's wheels require removal of the wheels from the vehicle, involve expensive machinery, and/or are complex and time consuming to implement.

SUMMARY OF THE INVENTION

In accordance with one embodiment of the present invention, an apparatus is provided for use in determining alignment of a wheel mounted to a vehicle. The apparatus comprises a plate, a housing, and a light source. The plate comprises a top surface, a bottom surface, and an outer perimeter. The bottom surface is substantially planar. The outer perimeter includes an engagement portion. The plate is configured such that it may be positioned at least partially within a wheel rim, with the engagement portion and the bottom surface contacting interior circumferential and interior annular surfaces of the wheel rim, respectively, and with the bottom surface of the plate substantially perpendicular to the wheel rotational axis. The housing is attached to the top surface of the plate. The housing defines a chamber. The light source is supported at least partially within the chamber and is configured to project light away from the housing.

In accordance with another embodiment of the present invention, a method is provided of inspecting a wheel mounted upon a vehicle. The method comprises positioning a vehicle adjacent to a template. The vehicle has at least one wheel including a rim. The rim has an interior circumferential surface and an interior annular surface. A projector assembly is provided which comprises a plate and a light source attached to the plate. The plate has a top surface, a bottom surface, and an outer perimeter. The bottom surface is substantially planar and the outer perimeter includes an engagement portion. The plate of the projector assembly is positioned at least partially within the rim such that the engagement portion contacts the interior circumferential surface and such that the bottom surface contacts the interior annular surface, and with the bottom surface of the plate substantially perpendicular to the rotational axis of the wheel such that the light source projects light onto the template. Alignment of the wheel is determined by observing the manner in which the light is projected upon the template by the light source.

In accordance with yet another embodiment of the present invention, a method of manufacturing a vehicle is provided. The method comprises assembling a vehicle from constituent components. The constituent components comprise at least one wheel having a rim. The vehicle is positioned adjacent to a floor template. A projector assembly is positioned into contact with the rim. The projector assembly projects light onto the floor template. Alignment of the wheel is determined by observing the manner in which the light is projected upon the floor template.

BRIEF DESCRIPTION OF THE DRAWINGS

While the specification concludes with claims particularly pointing out and distinctly claiming the present invention, it is believed that the same will be better understood from the following description taken in conjunction with the accompanying drawings in which:

DETAILED DESCRIPTION OF EMBODIMENTS

The present invention and its operation are hereinafter described in connection with the views and examples of FIGS. 1-5 and 6a-6d, wherein like numbers indicate the same or corresponding elements throughout the views. An apparatus or method in accordance with one embodiment of the present invention can be used to determine or measure alignment of a wheel attached to any of a variety of vehicles. Such vehicles can include cars, trucks, vans, buses, recreational vehicles, off-road vehicles, motorcycles, aircraft, and/or any of a variety of other vehicles. In one particular example, such an apparatus or method can be used to determine alignment of one or more wheels of an all terrain vehicle (ATV).

Alignment of a vehicle's wheels can be determined through use of the apparatus or method without having to remove the wheels from the vehicle (i.e., without removing the lug nuts or bolts). Accordingly, because the wheels need not be removed from a vehicle, alignment of the vehicle's wheels can be determined quickly and easily, and without significant time or labor expenditure. Such an apparatus or method can provide significant advantages during the manufacturing process of a vehicle, as wheel alignment can be easily and quickly verified during or following the assembly of a vehicle. However, such a method or apparatus can additionally provide advantages in measuring the alignment of a vehicle's wheels during routine maintenance or other servicing of the vehicle.

Figure 1:
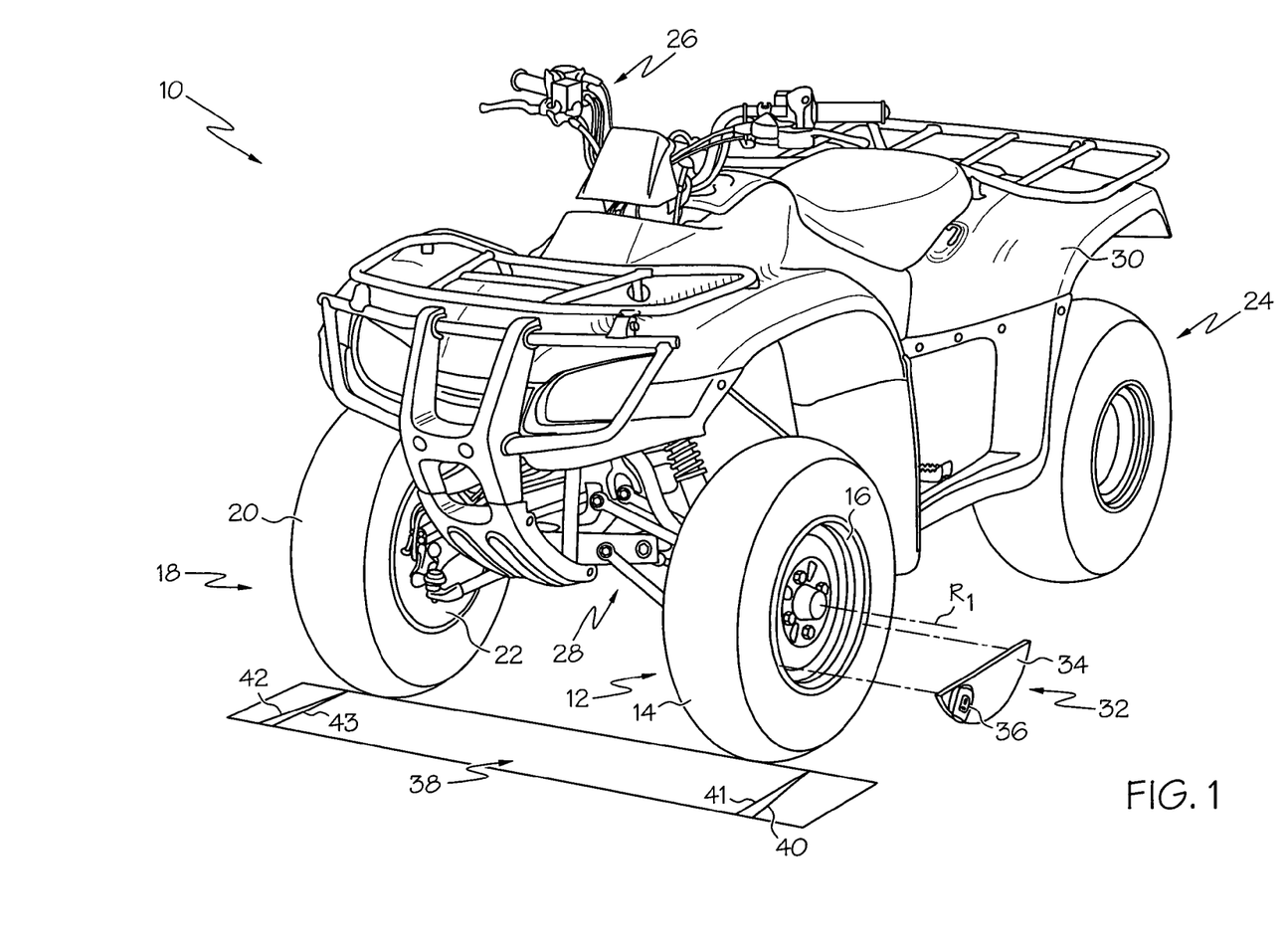
FIG. 1 is a perspective view of an ATV in conjunction with a projector assembly and a floor template.

The ATV 10 is shown to include front wheels 12 and 18 and rear wheels (e.g., 24). The wheels are supported with respect to a frame 28 of the ATV 10 by suspension components such as, for example, arms, shocks, struts, and springs. A body 30 can be formed from plastic, metal, or fiberglass, or any of a variety of other suitable materials, and can be directly or indirectly attached to the frame 28. A handlebar 26 is rotatably supported with respect to the frame 28 and is coupled with each of the front wheels 12 and 18 to facilitate steering of the front wheels 12 and 18 by an operator of the ATV 10.

Figure 5:
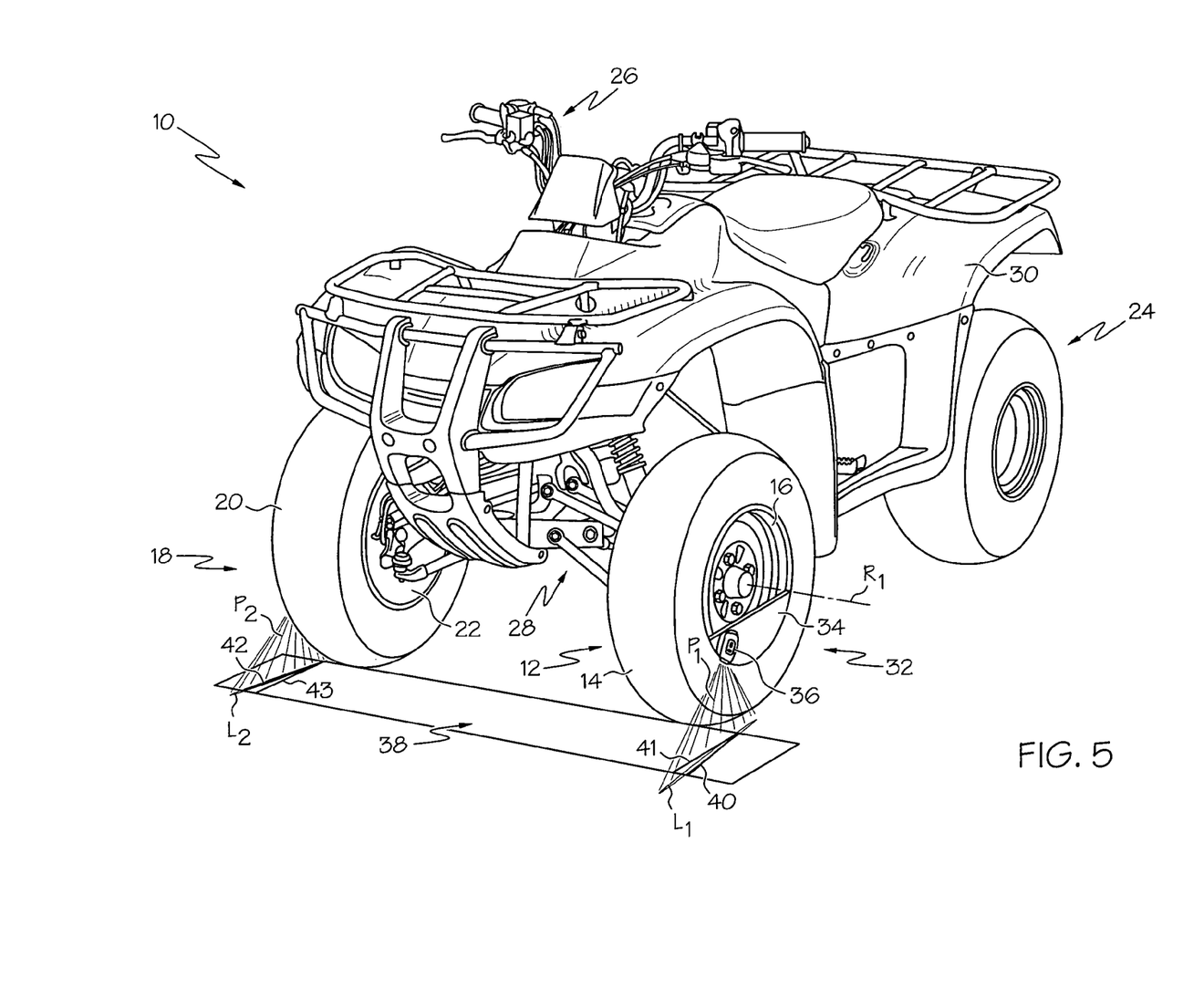
FIG. 5 is a front perspective view of the ATV of FIG. 1 wherein the projector assembly is positioned in contact with a left front wheel of the ATV and another projector assembly is positioned in contact with a right front wheel of the ATV.

The front wheel 12 is shown to include a tire 14 and a rim 16. Similarly, the front wheel 18 is shown to include a tire 20 and a rim 22. A projector assembly 32 is shown to be configured for being temporarily positioned into contact with the rim 16 of the front wheel 12 so that light can be emitted from the projector assembly 32 in a predetermined orientation relative to the front wheel 12, as discussed below. However, it will be appreciated that the projector assembly 32 may alternatively be positioned into contact with one or more other wheels of the ATV 10. In other embodiments, multiple projector assemblies may be provided for simultaneous contact with respective wheels of the same vehicle (e.g., as shown in FIG. 5).

The ATV 10 is also shown to be positioned adjacent to a floor template 38. The floor template 38 can include one or more markings (e.g. 40, 41, 42, 43) which can be painted, drawn, etched, cut, engraved, burned, scratched, or otherwise provided by or upon the floor template 38 prior to use. Markings might otherwise be provided by edges or other features of the template. Although the markings 40, 41, 42 and 43 are depicted as straight lines, it will be appreciated that markings can be provided upon a template in any of a variety of alternative configurations. For example, the markings can be selected from any of a variety of shapes and sizes, and can be provided in any of a variety of quantities and positions upon a template. It will be appreciated that the markings on a template can be sized, shaped and positioned to interact with light projected by a projector assembly in order that alignment of the vehicle's wheels can be quickly and accurately assessed.

Figure 2:
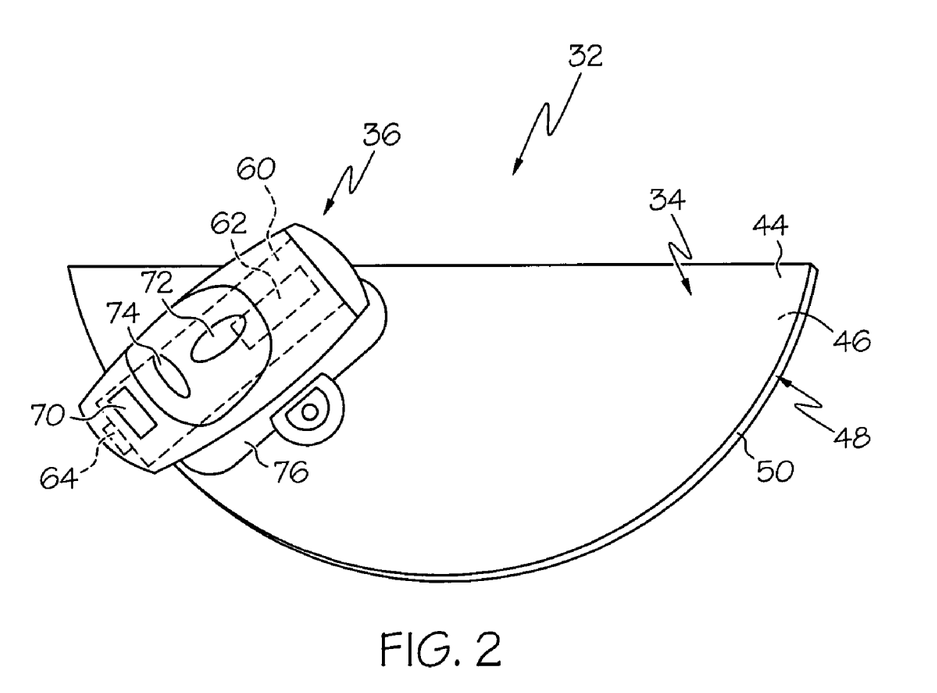
FIG. 2 is a perspective view depicting the projector assembly of FIG. 1.

FIG. 2 provides an enlarged perspective view of the projector assembly 32. The projector assembly 32 is shown to include a plate 34 and a housing 36. The housing 36 can comprise any of a variety of conventional laser pointing devices. For example, housing 36 can comprise a commercially available laser device which emits a plane of laser light for projection as a line upon a target. In one particular embodiment, the housing 36 can comprise a CRAFTSMAN™ LASERTRAC™ level device which is commonly marketed at SEARS™ stores in the United States. It will be appreciated that the housing 36 can have any of a variety of alternative configurations. As best shown in FIG. 2, the housing 36 can include bubble-type level indicators 72 and 74 which may or may not be useful in determining whether a wheel is properly aligned. Alternative housings might not include any such level-reading devices.

The housing 36 is also shown to include a switch 70 which can be configured as an on/off type switch for use in selectively activating a light source 64 disposed and supported at least partially within a chamber 60 defined by and within the housing 36. In this configuration, the switch 70 can selectively facilitate the transmission to the light source 64 of electrical power from one or more batteries (e.g., 62) provided within the chamber 60. However, an on/off type switch can alternatively be provided in any of a variety of other suitable locations and/or configurations. The switch 70 can additionally or alternatively be configured to enable an operator to vary the specific pattern of light which is emitted from, and thus projected by, the housing 36. For example, in one embodiment, the switch 70 can allow an operator to alter the light pattern between a plane and a point, and/or to alter the orientation of a plane with respect to the housing 36 (e.g., making the plane horizontal or vertical with respect to the housing 36). The light source 64 can emit and thus project light away from the housing 36 and can comprise a laser such as a laser LED 64. However, it will be appreciated that the light source 64 might alternatively be provided as an incandescent lamp, a florescent light bulb, a non-laser LED, and/or any of a variety of other suitable light emitting devices.

The housing 36 can have a base 76 which is configured for attachment to the plate 34. As shown in FIGS. 1-4, the housing 36 can be attached directly to the top surface 44 of the plate 34. However, in other embodiments, the housing 36 may be indirectly attached to the top surface 44 of the plate 34 (i.e., through one or more intermediate components) and/or otherwise attached to the plate 34. In one particular embodiment, the base 76 of the housing 36 includes magnets for use in attaching the housing 36 to the plate 34 (e.g., when the plate 34 comprises steel or other ferrous material). In alternative embodiments, the base 76 can be welded to the plate 34 and/or can be attached to the plate 34 through use of adhesives and/or fasteners. Hook and loop type fastener arrangements can alternatively be employed to facilitate attachment of the housing 36 to the plate 34. Accordingly, in one embodiment of the present invention, the housing 36 can be selectively removable from the plate 34. While the housing 36 may be capable of attachment to the plate 34 in any of a variety of different positions and locations, the plate 34 can alternatively be provided with one or more features to restrict attachment of the housing 36 to the plate 34 to a single position or location. In another embodiment of the present invention, the housing 36 might be integrally formed with the plate 34.

Figure 3:
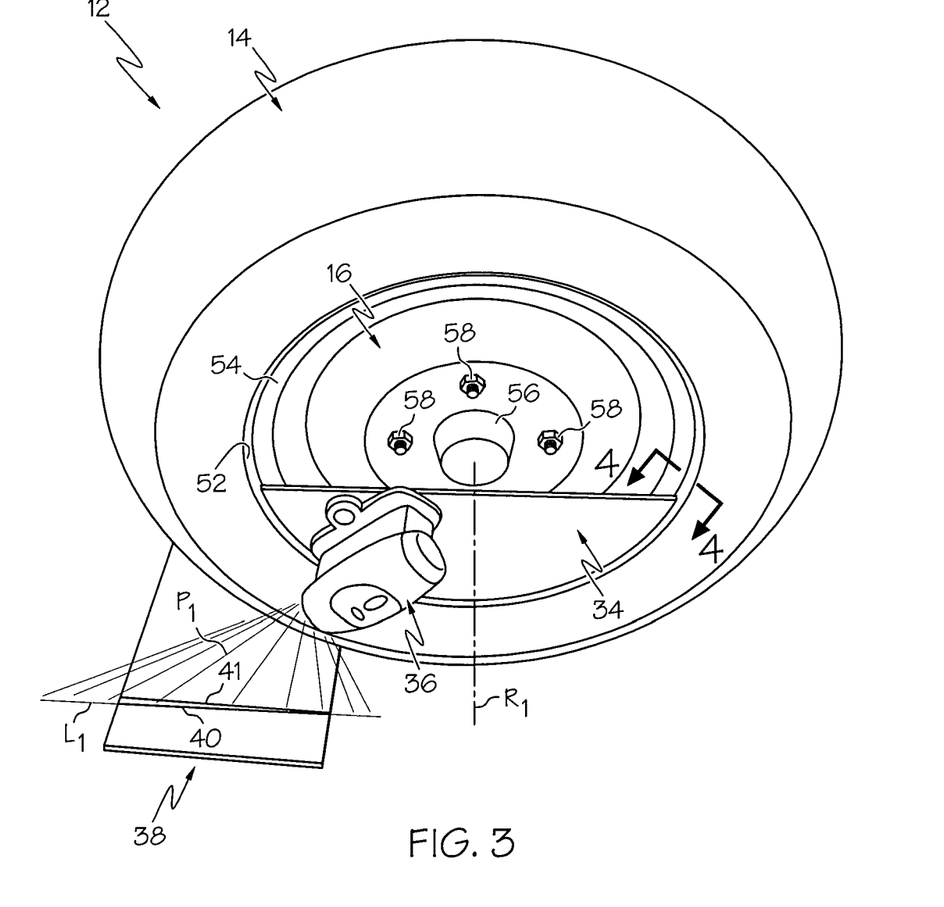
FIG. 3 is a side perspective view depicting the projector assembly and portions of the ATV and floor template of FIG. 1, wherein the projector assembly is positioned in contact with a left front wheel of the ATV.
Figure 4:
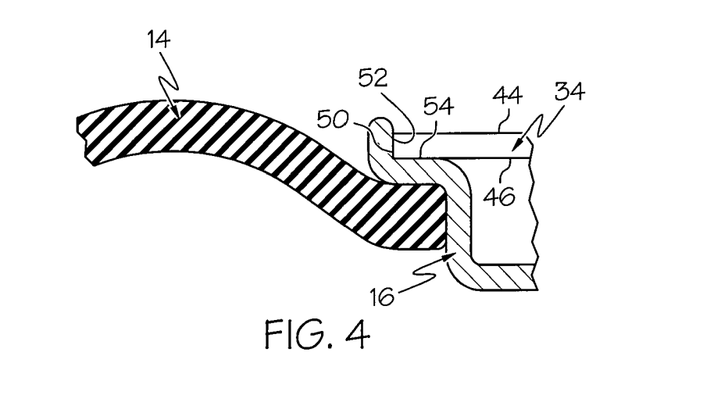
FIG. 4 is a partial sectional view depicting a portion of an interface between the projector assembly and the wheel of FIG. 3.

Referring to FIG. 2, the plate 34 is shown to have a top surface 34, a bottom surface 46, and an outer perimeter 48. The outer perimeter 48 includes an engagement portion 50. Referring to FIGS. 3-4, the plate 34 is configured such that it may be positioned at least partially within a wheel rim (e.g., 16), with the engagement portion 50 and the bottom surface 46 respectively contacting an interior circumferential surface 52 and an interior annular surface 54 of the wheel rim. In this position, the bottom surface 46 of the plate 34 is substantially perpendicular to the wheel rotational axis (e.g., $R_1$ in FIG. 3). The engagement portion 50 can be shaped to help ensure proper alignment of the plate 34 when the plate 34 is positioned in contact with the wheel rim. For example, as shown in FIG. 3, the engagement portion 50 of the plate 34 can have an arcuate shape which closely matches the arcuate shape of the interior circumferential surface 52 of the rim 16, which thereby helps to ensure that the plate 34 is properly aligned with respect to the rim 16.

Once placed into contact with a wheel rim, the plate may be held in place by the rim itself (e.g., by snugly fitting within the rim). In certain circumstances, an operator might use a mallet or other device to help encourage positioning of the plate into contact with the wheel rim. In other circumstances, the plate may easily fit and rest within a wheel rim without any use of force. After placement of the plate within a wheel rim, an operator might have to use a hand, foot or knee to keep the plate from falling from the wheel rim, and/or might employ one or more securement mechanisms. Such securement mechanisms may include, for example, magnets attached to the plate adjacent to the engagement portion for use in selectively maintaining contact between a projector assembly and a wheel rim. In another embodiment, such securement mechanisms might include clasps, latches, or straps for selectively grasping a wheel for maintaining selective contact between a projector assembly and a wheel rim. Any of a variety of other securement mechanisms may alternatively be provided.

The plate 34 can be sized and shaped for use with a particular wheel such that an operator may quickly, easily, and accurately position the plate with respect to the particular wheel. Therefore, different plates might be provided for use with different wheels, and may include indicia which identify which wheels, rims, and/or vehicles with which such plates are suitable for use. As such, when an operator selects a plate which is intended for use with a particular wheel, she can then easily position that plate into contact with that particular wheel for use in determining alignment. A different plate may then be used by an operator to subsequently determine alignment of a different type of wheel. In a vehicle manufacturing application, it will be appreciated that only a single type of plate may be required for use in determining alignment of the front and/or rear wheels of each of the vehicles manufactured, as all of those vehicles may employ the same type of front and/or rear wheels. However, additional plates might be provided as needed to accommodate different types of wheels. As it is anticipated that the cost and effort to produce the plates is minimal, and that the plates do not require significant storage space, it should not be overly burdensome to maintain a variety of plates which are suitable for use with whatever wheels are typically encountered by the operator. It will be appreciated that, in one embodiment, the housing may be removed from one plate and then attached to another plate as needed to accommodate selective measurement of different types of wheels.

When the projector assembly 32 is placed into contact with the rim 16 as depicted in FIG. 3, a plane of light $P_1$ emitted from a light source (e.g., a laser LED) within the housing 36 can be emitted substantially parallel with the bottom surface 46 of the plate 34 and substantially perpendicularly to the rotational axis $R_1$ of the wheel 12 for projection onto the floor template 38 as a line $L_1$. The line $L_1$ is shown to correspond with the marking 40 on the floor template 38, thereby indicating proper alignment of the front wheel 12. As shown in FIG. 5, alignment of both front wheels 12 and 18 of the ATV 10 can be accomplished simultaneously by employing a second projector assembly in conjunction with the front wheel 18. The second projector assembly projects a second plane of light $P_2$ as a line $L_2$ which corresponds with the marking 42 upon the floor template 38. In this manner, through use of two projector assemblies, alignment of both front wheels of a vehicle can be achieved simultaneously.

While the plane of light $P_1$ is shown as being substantially parallel with the top surface 44 and the bottom surface 46 of the plate 34, and substantially perpendicular to the rotational axis $R_1$ of the front wheel 12, it will be appreciated that light may be emitted from the housing 36 in any of a variety of alternative manners. For example, in one such alternative configuration, the light can be emitted in a plane substantially perpendicular with the top surface 44 and the bottom surface 46 of the plate 34, and substantially parallel with and/or including the rotational axis $R_1$ of the front wheel 12. In another such alternative configuration, the light can be emitted so as to project onto the surface of a template as a circle, point, or other configuration. It will be appreciated that any markings upon the corresponding template can be sized, shaped and positioned to interact with such alternative light patterns in order that alignment of the vehicle's wheel(s) can be quickly and accurately assessed.

A plate in accordance with one embodiment of the present invention comprises a flat sheet of metal, plastic or other material. As such, the top surface 34 and the bottom surface 46 of the plate 34 can be substantially planar. As discussed above, the engagement portion 50 is configured to contact an interior circumferential surface of a wheel rim in use. As shown in the embodiment of FIG. 2, the outer perimeter 48 of the plate 34 has a "D" shape, the engagement portion 50 of the plate 34 is substantially arcuately shaped, and over half of the outer perimeter 48 corresponds with the engagement portion 50. However, it will be appreciated that a plate in accordance with the present invention can be provided in any of a variety of alternative configurations.

Figures 6A, 6B, 6C, 6D:
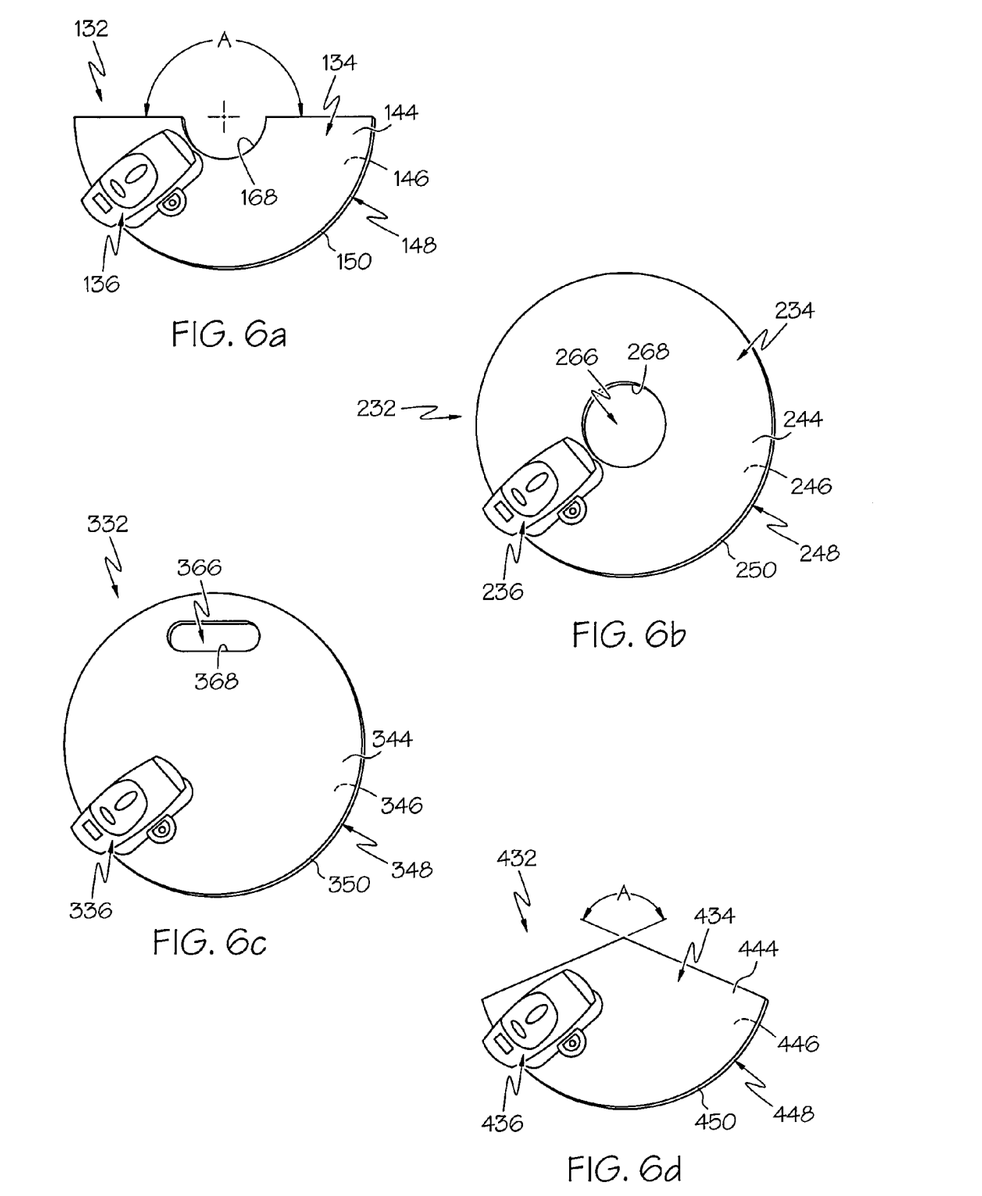
FIG. 6a is a perspective view depicting a projector assembly in accordance with another embodiment of the present invention.
FIG. 6b is a perspective view depicting a projector assembly in accordance with yet another embodiment of the present invention.
FIG. 6c is a perspective view depicting a projector assembly in accordance with another embodiment of the present invention.
FIG. 6d is a perspective view of a projector assembly in accordance with still another embodiment of the present invention.

For example, as shown in FIG. 6a, a projector assembly 132 is shown to include a plate 134 and a housing 136, wherein the plate 134 has a top surface 144, a bottom surface 146, and an outer perimeter 148. The outer perimeter 148 includes an engagement portion 150 which is shaped and configured for contacting a wheel rim in use. The plate 134 is also shown to include a cut-out 168, wherein this cut-out 168 can be shaped and sized to allow clearance for passage of a wheel hub (e.g. 56 in FIG. 3) and/or lug nuts/bolts (e.g. 58 in FIG. 3) so that the bottom surface 146 is substantially perpendicular to a rotational axis of the wheel when the plate 134 contacts the wheel rim. The engagement portion 150 can extend along an arc angle of at least about 180°. For example, as shown in FIG. 6a, the engagement portion 150 extends along an arc angle A of about 180°.

Referring now to FIG. 6b, a projector assembly 232 is shown to include a plate 234 and a housing 236, wherein the plate 234 includes a top surface 244, a bottom surface 246, and an outer perimeter 248. The outer perimeter 248 includes an engagement portion 250 for contacting the rim of a wheel in use. The plate 134 is also shown to include a central opening 266 having a cut-out 268, wherein this cut-out 268 can be shaped and sized to allow clearance for passage of a wheel hub (e.g. 56 in FIG. 3) and/or lug nuts/bolts (e.g. 58 in FIG. 3) so that the bottom surface 246 is substantially perpendicular to a rotational axis of the wheel when the plate 234 contacts the wheel rim. The cut-out 268 can also allow for easy installation and/or removal of the plate 234 from a wheel by an operator. In the embodiment of FIG. 6b, the engagement portion 250 extends along an arc angle of 360°.

Referring now to FIG. 6c, a projector assembly 332 is shown to include a plate 334 and a housing 336, wherein the plate 334 includes a top surface 344, a bottom surface 346, and an outer perimeter 348. The outer perimeter 348 includes an engagement portion 350 which, as discussed with respect to FIG. 6b above, has an arc angle of 360°. The plate 334 also includes a cut-out 368 which can serve as a handle 366 to facilitate easy installation and/or removal of the projector assembly 332 from a wheel.

As shown in FIG. 6d, a projector assembly 432 in accordance with another embodiment of the present invention includes a plate 434 and a housing 436. The plate 434 includes a top surface 444, a bottom surface 446, and an outer perimeter 448. The outer perimeter 448 includes an engagement portion 450 for contacting a rim of a wheel in use. The engagement portion 450 is shown to extend along an arc angle A of about 135°. In other embodiments, the engagement portion 450 can extend along a greater or lesser arc angle.

Referring again to FIG. 1, in order to determine whether the front wheel 12 of the ATV 10 is properly aligned, the ATV 10 is positioned adjacent to a template. In one particular embodiment, the template comprises a floor template 38 which is positioned flatly upon the floor. For example, the floor template 38 can comprise a mat or board which is placed freely upon the floor or is attached to the floor (e.g., with fasteners and/or adhesives). Alternatively, the floor template 38 may be painted, etched, adhered, or otherwise provided on the floor itself. Although the floor template 38 is shown in FIG. 1 as being positioned ahead of the ATV 10, it will be appreciated that the floor template might alternatively be positioned elsewhere upon the floor with respect to the ATV 10 (e.g., beside, behind and/or beneath the ATV 10). In certain other embodiments, the template might not comprise a floor template, but might instead comprise a vertically oriented template as might be positioned upon a wall or stand beside, behind, or ahead of the ATV 10.

In accordance with one embodiment of the present invention, the template may be stationary (e.g., as a permanent or semi-permanent fixture of a building), and a vehicle can be moved into proximity to the template in order that alignment of the vehicle's wheel(s) can be determined. In such circumstance, certain devices can be present to ensure that the vehicle is properly positioned with respect to the template. For example, indicia and/or tracks can be provided upon the floor for contacting the wheels of a vehicle and/or for receiving illumination from above the vehicle when the vehicle is properly positioned with respect to the template. As another example, stationary light sources (e.g., lasers) can project light onto predetermined components of the vehicle when the vehicle is properly aligned with respect to the floor template. Any of a variety of other devices or arrangements may alternatively be employed to ensure proper alignment of a vehicle with respect to the template.

In accordance with another embodiment of the present invention, the template may be readily moveable with respect to a vehicle, and can be moved to a position adjacent to the vehicle to determine alignment of the vehicle's wheel(s). For example, the template can comprise a floor template which is made from metal and which is configured for movement and placement adjacent to one or more wheels of a vehicle. Any of a variety of techniques can be used to ensure alignment of the template with the vehicle. In one particular example, as shown in FIG. 5, the floor template 38 is configured to simultaneously receive light from two projector assemblies which are respectively associated with each of the front wheels 12 and 18 of the ATV 10. If the light projected by each of the projector assemblies substantially overlies the appropriate markings (e.g., 40 and 42) upon the floor template 38 (shown in FIG. 5), then in many cases it can be assumed that alignment of the floor template 38 with respect to the ATV 10 is correct, as is the alignment of each of the front wheels 12 and 18 (assuming that it is unlikely that both the left and right wheels will be misaligned in the same manner and degree). In this manner, in a single step, alignment of the floor template 38, the ATV 10, and the front wheels 12 and 18 can be determined. It will be appreciated that any of a variety of other suitable techniques may be used to align a template (e.g., the floor template 38) with a vehicle.

Before or after positioning the floor template 38, the projector assembly 32 is positioned at least partially within the rim 16 of the front wheel 12 such that the engagement portion 50 of the plate 34 of the projector assembly 32 contacts the interior circumferential surface 52 of the rim 16, and such that the bottom surface 46 of the plate 34 contacts the interior annular surface 54 of the rim 16. In this position, the bottom surface 46 is substantially perpendicular to the rotational axis $R_1$ of the front wheel 12, and the light source within the housing 36 projects light onto the floor template 38. In one embodiment, the light is emitted from the light source as a plane of laser light $P_1$ which follows a direction substantially parallel with the bottom surface 46 of the plate 34 and projects onto the floor template 38 as a straight line $L_1$.

Alignment of the front wheel 12 can then be determined by observing the manner in which the light is projected upon the floor template 38 by the light source. In particular, because the line of light $L_1$ substantially overlies the marking 40 on the floor template 38, as shown in FIG. 3, an operator can easily determine whether the alignment of the front wheel 12 is correct. Based upon the results of this determination, if the front wheel 12 is found to be misaligned, an operator can then take steps to properly align the front wheel 12. It will be appreciated that alignment of a wheel can often be adjusted by adjusting the suspension components (e.g., the tie rod ends) associated with that wheel. After the alignment of the front wheel 12 is adjusted, alignment of the front wheel 12 can then be re-inspected by repeating the above steps. This process can also be provided as a quality-control step in a method of manufacturing a vehicle (e.g., the ATV 10 of FIG. 1) which includes assembling the vehicle from constituent components.

A projector assembly in accordance with one embodiment of the present invention can be configured to be selectively positioned into contact with a wheel of a type which includes a tire, a tube, and a rim. In another embodiment, a projector assembly can be configured to be positioned into contact with a tubeless-type wheel which includes a tire and a rim (e.g., shown in FIG. 4). In still another embodiment, a projector assembly can be configured to be positioned into contact with a one-piece type wheel such as a wheel formed entirely or substantially entirely from steel or rubber (e.g., the wheel of a cargo train).

Determining whether front wheels of a vehicle are properly aligned often involves what is referred to as a "front-end alignment". In a front-end alignment, camber of the front wheels is determined and, in some circumstances, adjusted. Camber is the inward or outward tilt of a wheel when viewed from the front of the vehicle. When the camber is positive, the tops of the wheels are further apart than are the bottoms of the wheels. When the camber is negative, the tops of the wheels are closer together than are the bottoms of the wheels. Correct camber reduces tire wear and improves handling. Toe might also be determined and adjusted during a front-end alignment. When toe-in is present, the distance between wheels is less at the front of the wheels than at the back of the wheels (i.e., when viewed from above). Conversely, when toe-out is present, the distance between the wheels is less at the back of the wheels than at the front of the wheels.

It will be appreciated that an apparatus or method in accordance with one embodiment of the present invention can be employed to determine whether camber and toe for the wheels of a vehicle are correct, and thus facilitate completion of a front-end alignment. In particular, desired camber and toe of a vehicle's wheels can accordingly be considered when creating the template and in particular, in placing markings (e.g., 40 and 42) upon the template (e.g., floor template 38). An apparatus or method in accordance with another embodiment of the present invention can additionally or alternatively be employed to determine whether other settings for a wheel are correct.

The foregoing description of embodiments and examples of the invention has been presented for purposes of illustration and description. It is not intended to be exhaustive or to limit the invention to the forms described. Numerous modifications are possible in light of the above teachings. Some of those modifications have been discussed and others will be understood by those skilled in the art. The embodiments were chosen and described in order to best illustrate the principles of the invention and various embodiments as are suited to the particular use contemplated. The scope of the invention is, of course, not limited to the examples or embodiments set forth herein, but can be employed in any number of applications and equivalent devices by those of ordinary skill in the art. Rather it is hereby intended the scope of the invention be defined by the claims appended hereto.

What is claimed is:

1. A method of inspecting a wheel mounted upon a vehicle, the method comprising:
   positioning a vehicle adjacent to a template, the vehicle having at least one wheel including a rim, the rim having an interior circumferential surface and an interior annular surface;
   providing a projector assembly comprising a plate and a light source attached to the plate, wherein the plate has a top surface, a bottom surface, and an outer perimeter, the bottom surface is substantially planar, and the outer perimeter includes an engagement portion;
   positioning the plate of the projector assembly at least partially within the rim of the wheel, while the wheel is mounted on the vehicle, such that the engagement portion contacts the interior circumferential surface and such that the bottom surface contacts the interior annular surface, with the bottom surface of the plate substantially perpendicular to the rotational axis of said wheel such that the light source projects light onto the template;
   emitting from the light source a plane of laser light that is substantially parallel with the bottom surface of the plate for protection onto the template as a line; and
   determining alignment of said wheel by observing the manner in which the light is projected upon the template by the light source.

2. The method of claim 1 further comprising positioning the template flatly upon the floor.

3. The method of claim 2 wherein the plane of laser light is substantially perpendicular to the rotational axis of said wheel.

4. The method of claim 3 further comprising adjusting alignment of said wheel based upon the results of said determining step, and then re-inspecting alignment of said wheel after said adjustment.

5. The method of claim 1, wherein:
   the plate is devoid of apertures.

6. The method of claim 1, further comprising:
   positioning the light source proximate the rim of the wheel.

7. A method of manufacturing a vehicle, the method comprising:
   assembling a vehicle from constituent components, wherein the constituent components comprise at least one wheel having a rim;
   positioning the vehicle adjacent to a floor template;
   positioning a projector assembly into contact with the rim, while the wheel is mounted on the vehicle, wherein the projector assembly projects light onto the floor template;
   emitting the light from the projector assembly as a plane of laser light that is substantially perpendicular to a rotational axis of said wheel for projection onto the floor template as a line; and
   determining alignment of said wheel by observing the manner in which the light is projected upon the floor template.

8. The method of claim 7 wherein the projector assembly comprises a plate having a top surface, a bottom surface, and an outer perimeter, wherein the bottom surface is substantially planar, the outer perimeter includes an engagement portion, the rim includes an interior circumferential surface and an interior annular surface, and the positioning step involves contact between the engagement portion and the interior circumferential surface and between the bottom surface and the interior annular surface such that the bottom surface of the plate is substantially perpendicular to the rotational axis of said wheel.

9. The method of claim 8 wherein the plane of laser light is substantially parallel to the bottom surface of the plate.

10. The method of claim 9, wherein the plate comprises a cut-out that is shaped and sized to allow clearance of at least one of a wheel hub, a lug nut and a lug bolt.

11. The method of claim 7 further comprising adjusting alignment of said wheel based upon the results of said determining step, and then re-inspecting alignment of said wheel after said adjustment.

12. The method of claim 7 wherein the vehicle comprises an all terrain vehicle.

13. The method of claim 8, wherein:
   the plate is devoid of apertures.

* * * * *

UNITED STATES PATENT AND TRADEMARK OFFICE
CERTIFICATE OF CORRECTION

PATENT NO. : 7,621,054 B2 Page 1 of 1
APPLICATION NO. : 11/724342
DATED : November 24, 2009
INVENTOR(S) : Abke It is certified that error appears in the above-identified patent and that said Letters Patent is hereby corrected as shown below:

Column 9, line 33, "protection" is changed to --projection--.

Signed and Sealed this

Nineteenth Day of January, 2010

David J. Kappos
*Director of the United States Patent and Trademark Office*